(12) United States Patent  
Burgess

(10) Patent No.: US 8,918,718 B2  
(45) Date of Patent: Dec. 23, 2014

(54) READING PERFORMANCE SYSTEM

(75) Inventor: John Burgess, Watsonville, CA (US)

(73) Assignee: John Burgess Reading Performance System, Watsonville, CA (US)

( * ) Notice: Subject to any disclaimer, the term of this patent is extended or adjusted under 35 U.S.C. 154(b) by 0 days.

(21) Appl. No.: 13/405,566

(22) Filed: Feb. 27, 2012

(65) Prior Publication Data

US 2013/0227421 A1  Aug. 29, 2013

(51) Int. Cl.
*G06F 3/00* (2006.01)
*G06F 3/048* (2013.01)
(Continued)

(52) U.S. Cl.
CPC .............. *G06F 3/048* (2013.01); *G09B 17/003* (2013.01); *G09B 17/04* (2013.01); *G06F*
(Continued)

(58) Field of Classification Search
CPC . G06K 9/00; G06K 9/00033; G06K 9/00026; G06K 9/00181; G09B 17/00; G09B 17/04; G09B 17/003; G09B 5/04; G09B 7/00; G09B 5/00; G09B 3/00; G06F 3/048; A63F 9/0098; A63F 3/0421; A63F 3/0423; A63F 2003/0423; A63F 2300/208; A63F 2011/0083; A63F 2011/0076; A63F 2011/0093
USPC .......... 715/738; 434/159–161, 167, 169–173, 434/178–185, 335, 343, 349, 428, 433, 434/177; 463/9, 23, 42
See application file for complete search history.

(56) References Cited

U.S. PATENT DOCUMENTS 5,393,062 A * 2/1995 Cember .................... 273/153 R
5,651,678 A * 7/1997 Phillips ........................ 434/170
(Continued)

OTHER PUBLICATIONS

Kids Learning Station, "Sight Words Activity Worksheet—You, and, Play, and With", Apr. 29, 2010, http://www.kidslearningstation.com/phonics/sight-words/activities/you-and-play-with.asp, Last viewed on Jun. 11, 2013, p. 1.*

(Continued)

*Primary Examiner* — Patrick Riegler
*Assistant Examiner* — Jennifer Nichols
(74) *Attorney, Agent, or Firm* — Donald R Boys; Central Coast Patent Agency, Inc

(57) ABSTRACT

A system for enhancing reading performance operates on a network-connected server with software executing from a non-transitory medium at the server providing an interactive interface for a user connected to the server via a browser link. There is a data repository coupled to the server. The interactive interface provides a word search exercise for the user for improving the user's reading performance, displays a passage comprising a first number of words and a search list with a second number of words that each appear at least once in the passage, the second number smaller than the first number, and when the user clicks on every word in the passage for a word that appears in the search list, that word is indicated in the list as found, until all the words in the search list have been indicated as found.

8 Claims, 19 Drawing Sheets

(51) Int. Cl.

| | | |
|---|---|---|
| *G09B 17/00* | (2006.01) | |
| *G09B 17/04* | (2006.01) | |
| *G06F 3/0484* | (2013.01) | |
| *A63F 3/04* | (2006.01) | |
| *G09B 3/00* | (2006.01) | |
| *G09B 5/00* | (2006.01) | |
| *G06K 9/00* | (2006.01) | |
| *G09B 7/00* | (2006.01) | |
| *G09B 5/04* | (2006.01) | |
| *A63F 9/00* | (2006.01) | |
| *A63F 11/00* | (2006.01) | |

(52) U.S. Cl.
CPC ... 3/0484 (2013.01); *G06F 3/04847* (2013.01); *A63F 3/0423* (2013.01); *G09B 3/00* (2013.01); *G09B 5/00* (2013.01); *G06K 9/00026* (2013.01); *G09B 7/00* (2013.01); *G06K 9/00* (2013.01); *G06K 9/00181* (2013.01); *G09B 5/04* (2013.01); *G06K 9/00033* (2013.01); *G09B 17/00* (2013.01); *A63F 9/0098* (2013.01); *A63F 3/0421* (2013.01); *A63F 2011/0093* (2013.01); *A63F 2011/0076* (2013.01); *A63F 2011/0083* (2013.01); *A63F 2300/208* (2013.01)
USPC .......... 715/738; 434/159; 434/160; 434/161; 434/167; 434/169; 434/170; 434/171; 434/172; 434/173; 434/178; 434/179; 434/180; 434/181; 434/182; 434/183; 434/184; 434/185; 434/335; 434/343; 434/349; 434/428; 434/433; 434/177; 463/9; 463/23; 463/42

(56) References Cited

U.S. PATENT DOCUMENTS

| | | | | |
|---|---|---|---|---|
| 5,680,511 | A * | 10/1997 | Baker et al. | 704/257 |
| 5,893,132 | A * | 4/1999 | Huffman et al. | 715/201 |
| 6,154,757 | A * | 11/2000 | Krause et al. | 715/205 |
| 6,279,017 | B1 * | 8/2001 | Walker | 715/201 |
| 6,602,133 | B2 * | 8/2003 | Chan | 463/9 |
| 6,729,729 | B1 * | 5/2004 | Irons | 351/242 |
| 7,568,160 | B2 * | 7/2009 | Berger et al. | 715/750 |
| 7,702,611 | B2 * | 4/2010 | Chi et al. | 707/999.001 |
| 2002/0124026 | A1 * | 9/2002 | Weber | 707/526 |
| 2002/0156632 | A1 * | 10/2002 | Haynes et al. | 704/270 |
| 2003/0027114 | A1 * | 2/2003 | Sims-Barnes | 434/178 |
| 2003/0129574 | A1 * | 7/2003 | Ferriol et al. | 434/362 |
| 2003/0172353 | A1 * | 9/2003 | Cragun | 715/517 |
| 2004/0242295 | A1 * | 12/2004 | Ghaly | 463/10 |
| 2005/0026128 | A1 * | 2/2005 | Wood et al. | 434/317 |
| 2005/0035543 | A1 * | 2/2005 | Kabak | 273/153 R |
| 2005/0069849 | A1 * | 3/2005 | McKinney et al. | 434/178 |
| 2005/0106539 | A1 * | 5/2005 | Bagley et al. | 434/169 |
| 2006/0069561 | A1 * | 3/2006 | Beattie et al. | 704/251 |
| 2006/0069562 | A1 * | 3/2006 | Adams et al. | 704/251 |
| 2007/0011005 | A1 * | 1/2007 | Morrison et al. | 704/231 |
| 2007/0202474 | A1 * | 8/2007 | Miller | 434/156 |
| 2007/0238077 | A1 * | 10/2007 | Strachar | 434/178 |
| 2008/0096171 | A1 * | 4/2008 | Movahhedi | 434/178 |
| 2008/0140401 | A1 * | 6/2008 | Abrash et al. | 704/251 |
| 2008/0140652 | A1 * | 6/2008 | Millman et al. | 707/6 |
| 2009/0142737 | A1 * | 6/2009 | Breig | 434/178 |
| 2009/0239202 | A1 * | 9/2009 | Stone | 434/178 |
| 2009/0246744 | A1 * | 10/2009 | Lofthus et al. | 434/169 |
| 2009/0298594 | A1 * | 12/2009 | Pueyo et al. | 463/42 |
| 2010/0021871 | A1 * | 1/2010 | Layng et al. | 434/178 |
| 2011/0059423 | A1 * | 3/2011 | Kadar et al. | 434/185 |
| 2011/0111377 | A1 * | 5/2011 | Dekkers | 434/156 |
| 2011/0144978 | A1 * | 6/2011 | Tinkler | 704/10 |
| 2011/0306023 | A1 * | 12/2011 | Blank et al. | 434/178 |
| 2012/0200573 | A1 * | 8/2012 | Stoner et al. | 345/472 |
| 2013/0079077 | A1 * | 3/2013 | Stegall | 463/9 |
| 2013/0080471 | A1 * | 3/2013 | Forte et al. | 707/785 |

OTHER PUBLICATIONS

A to Z Teacher, "Word Search Maker", Jun. 4, 2006, http://tools.atozteacherstuff.com/word-search-maker/wordsearch.php, Last viewed on Feb. 19, 2014.*

* cited by examiner

*RPS*

| My Account - John Burgess | [Edit Account] |

Only Plain Text documents with an extension of txt may be uploaded

Material Name: [601]

File: [602]  Browse

Upload

My Material:

Delete?  Name
☐  Una Abeja Presidente
☐  Una Abeja Presidente
☐  Biology Overview
☐  Einstein's Big Idea
☐  Americal Revolution Delete Selected Material Logout  501
Back to Website  502
503
603
604
605
606
607

*Fig. 6*

*RPS*

Column Exercise

| John Burgess | My Account |
| --- | --- |
| | View Instructions |

① Reading Material [Choose]
Select Source

② Number of Columns
○ 1  ● 2  ○ 3  ○ 4

③ Column Width (2 words)

④ Reading Direction
● Left to Right  ○ Top to Bottom
○ Right to Left  ○ Bottom to Top (Continued Fig. 8b)

Continue to Exercise — 705

501 — Logout
502 — Back to Website

⑤ Explode Rate  50

⑥ Iterations  1 ○  2 ●  3 ○  4 ○  5 ○

⑦ Font Size  (14 pt.)

⑧ Colors  Default →
☐ Font Color
☐ Background Color

*RPS*

Numbers Exercise ← 1101

| 15 | 12 | 8 | 9 |
| 16 | 13 | 10 | 5 |
| 4 | 11 | ⑤ | 14 | 6 |
| 7 | 3 | 2 | 1 |

Logout ← 501
Back to Website ← 502

John Burgess  My Account

View Instructions

① Spacing  [====■====] 15

② Font Size [====■====] 14

③ Colors  [Default →]
☐ Font Color
☐ Background Color

[▲ Continue to Exercise] ← 705

*Fig. 11*

READING PERFORMANCE SYSTEM

BACKGROUND OF THE INVENTION

1. Field of the Invention

The present invention is in the technical area of systems for enhancing reading performance, and pertains more particularly to a network enabled system providing unique services for persons accessing the system via network-connected computerized appliances.

2. Description of the State of the Art

Educational systems dedicated to or including material implemented for aiding persons to improve reading performance and retention are well known in the art. It is also well known in the art that reading is a complex process involving all of the human senses and complex mental processes (brain functions). Moreover, the inventor has found in developing reading performance systems that many people lack natural access to many brain functions required during the reading process. As a result, these people struggle to keep up with reading needs and find it quite difficult to improve their reading skills and retention of what is read. Brain functions are localized and hierarchical. Perceptual pathways depend on the accurate processing of preceding information before being passed along to other functional areas of the brain.

Much research in how the human brain functions is recent, has not been incorporated into reading performance systems, and in most cases new knowledge about brain functions would not be intuitive to include in such systems. Consequently what is needed is a reading performance system that takes latest knowledge regarding brain function into account, and provides new and novel ways incorporating such knowledge into user-accessible tasks and processes to enhance reading performance.

BRIEF SUMMARY OF THE INVENTION

In an embodiment of the present invention a system for enhancing reading performance is provided, comprising a network-connected server, software executing from a non transitory medium at the server providing an interactive interface for a user connected to the server via a browser link, and a data repository coupled to the server. The interactive interface provides a word search exercise for the user for improving the user's reading performance, displays a passage comprising a first number of words and a search list with a second number of words that each appear at least once in the passage, the second number smaller than the first number, and when the user clicks on every word in the passage for a word that appears in the search list, that word is indicated in the list as found, until all the words in the search list have been indicated as found.

In one embodiment the user is enabled to set the number of words in the search list, and the system selects the words. Also in one embodiment, once all words in the search list are indicated as found, the user is enabled to repeat the exercise with a new search list of words, with different words than in the first list but of the same number. Still in one embodiment words in the search list are indicated as found by strikethrough.

In some embodiments the user is enabled to select reading material for the passage from among reading material stored for that user. Also in some embodiments the user is enabled to upload reading material to be stored for use by the system in exercises for the user. The user can set a time limit for completing the exercise, and in some embodiments may also set the first number of words for the passage to be displayed. The user may also set font size and colors for the exercise.

In some embodiments game statistics are kept by the system for each session of the exercise with the user, measuring the user's performance against the time limit, and a performance summary is made available to the user.

In another aspect of the invention a method for enhancing reading performance for a user is provided, comprising the steps of (a) providing an interactive display for a user by software executing on a network-connected server from a non transitory medium, the user connected to the server through a network link; (b) displaying in the interactive interface a passage comprising a first number of words and a search list with a second number of words that each appear at least once in the passage, the second number smaller than the first number; (c) indicating in the search list, for a word in the search list which the user finds and clicks on in the passage every word in the passage for the word, that the word has been found; and (d) continuing the exercise until all words in the search list are indicated as found.

In one embodiment of the method the user is enabled to set the number of words in the search list, and the system selects the words. Also in one embodiment of the method, once all words in the search list are indicated as found, the user is enabled to repeat the exercise with a new search list of words, with different words than in the first list but of the same number.

In one embodiment words in the search list are indicated as found by strikethrough. The user may be enabled to select reading material for the passage from among reading material stored for that user, and also to upload reading material to be stored for use by the system in exercises for the user. The user can set a time limit for completing the exercise. Also the user may set the first number of words for the passage to be displayed, as well as to set font size and colors for the exercise.

In one embodiment game statistics are kept by the system for each session of the exercise with the user, measuring the user's performance against the time limit, and a performance summary is made available to the user.

BRIEF DESCRIPTION OF THE SEVERAL VIEWS OF THE DRAWINGS

FIG. 6 is an illustration of an upload page for use by a person (user) to upload reading material to the system of the invention.

FIG. 8*a* is an illustration of a control page for a column exercise in an embodiment of the invention.

FIG. 9b is an illustration of additional parameter inputs for the page of FIG. 9a.

FIG. 10a is an illustration of a control page for a chunk exercise in an embodiment of the invention.

FIG. 10b is an illustration of additional parameter inputs for the page of FIG. 10a.

FIG. 11 is an illustration of a control page for a number exercise in an embodiment of the invention.

FIG. 12b is an illustration of additional parameter inputs for the page of FIG. 12a.

FIG. 13b is an illustration of additional parameter inputs for the page of FIG. 13a.

DETAILED DESCRIPTION OF THE INVENTION

Figure 1:
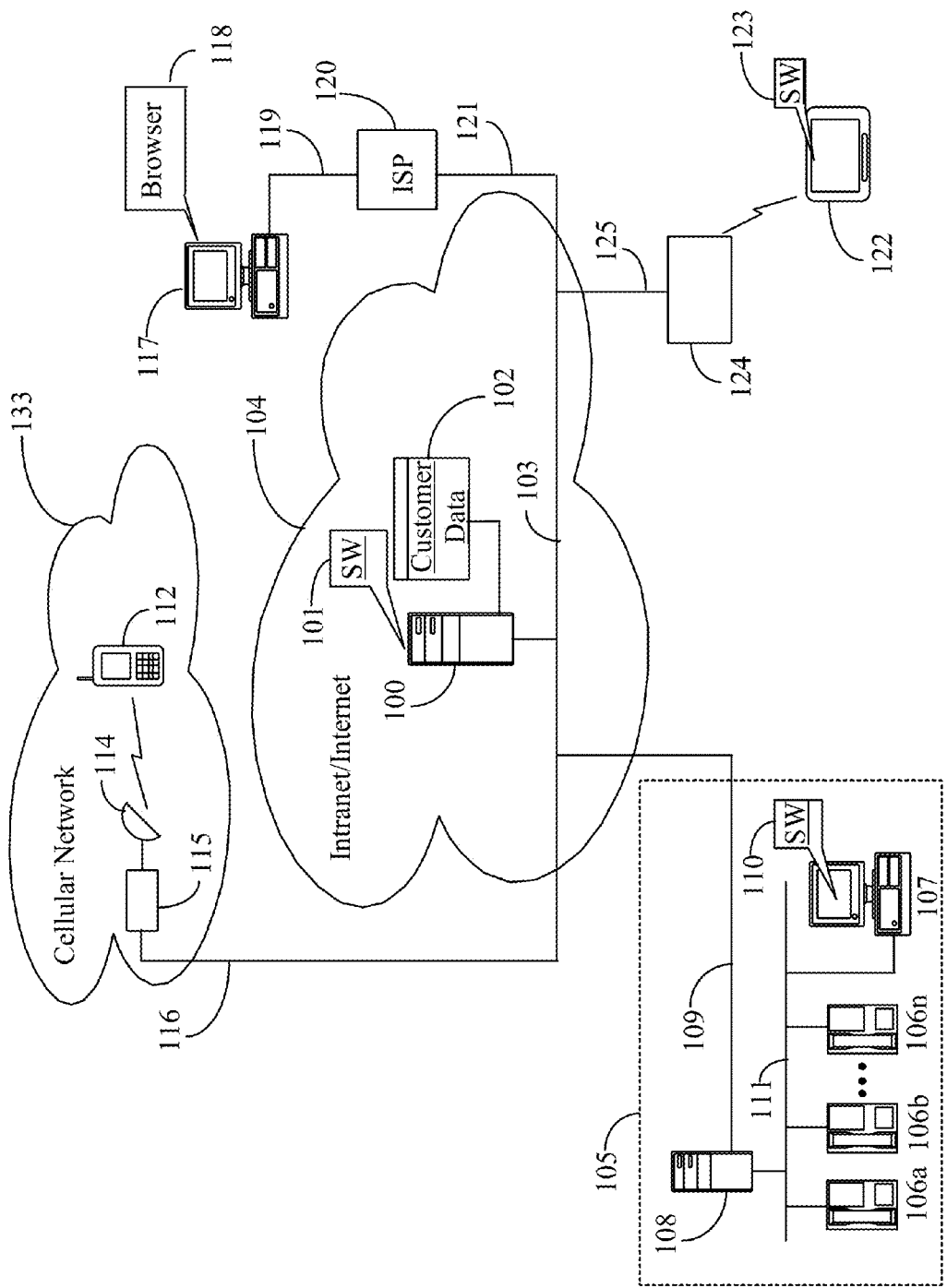
FIG. 1 is an architectural diagram illustrating a reading performance system according to an embodiment of the present invention.

FIG. 1 is an architectural diagram illustrating a reading performance system and support systems according to an embodiment of the present invention. In this system at least one Internet-connected server 100 executes software 101, which software includes all functionality that implements interactive interfaces for computerized appliances that may connect to the server through the Internet network, other functions that are necessary and conventional for such servers, and additionally all functionality for a unique Reading Performance System (RPS) presented to connecting users through interactive interfaces on computerized appliances operated by those users.

In the RPS according to various embodiments of the invention users, also termed clients in this specification, are typically registered voluntarily to the system, and provide personal and contact information, implemented as profiles in at least one database (dB) stored in a mass storage system 102 coupled to server 100. Mass storage 102 is shown connected directly to the server, but may also be coupled to the server over Internet backbone 103 or by other known data link. User profiles have various uses in the system, including the implementation of user-specific pages and processes managed by the RPS.

A user-operated personal computer 117 is shown connected to an Internet Service Provider (ISP) 120, in turn connected to Internet backbone 103. This representation is meant to include a variety of computer types, such as desktop and laptop computers which may be operated by clients of the RPS. Such computers may have Internet access by a variety of known means other than ISP shown, and appliance 117 is illustrated operating an Internet Browser application 118, of which several are commercially available, and are adequate to aid in practice of the present invention.

A cellular network 133 is illustrated in FIG. 1, wherein a smart-phone device 112 is communicating with a base station 115 via antenna 114. Base station 115 connects to Internet backbone 103 by path 116, which may be accomplished in several ways known in the art. Smart-phone 112 may execute a light browser to present interactive interfaces to a user, and can be used in embodiments to practice the present invention.

A computerized Pad device 122 is illustrated connecting wirelessly via a WiFi system 124, which accesses Internet backbone 103 via path 125, and is meant to represent devices of various sorts which users may utilize to practice the present invention in various embodiments through wireless network systems, such as are provided in many commercial establishments. Appliance 122 may also be such as a laptop computer.

A sub-network 105 is illustrated in FIG. 1 wherein a server 108 accesses Internet backbone 103 via path 109, and connects to a plurality of stations 106 and 107 by a local area network (LAN) 111. Users with devices that connect to LAN 111 may access and use the RPS of this invention as long as they have browsers and interactive interfaces that are competent to the purpose.

Figure 2:
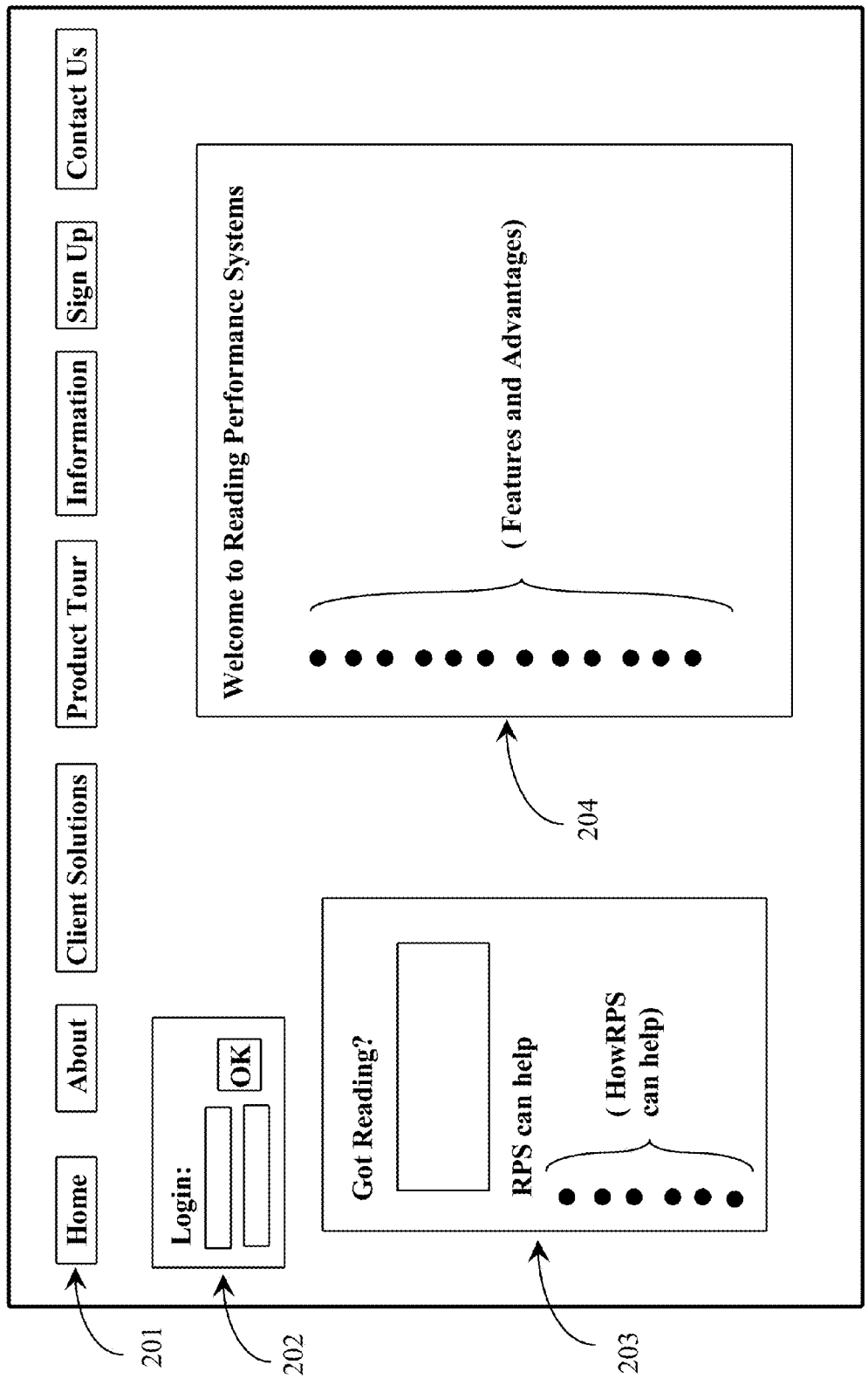
FIG. 2 is an illustration of an exemplary home page presented to various users in one embodiment of the present invention.

FIG. 2 is an illustration of an exemplary homepage presented to various users in one embodiment by the RPS executing as a part of SW 101 in server 100 in the Internet network. A menu bar 201 is provided that links a user to a variety of functions and information pages. There is a Log-In function 202 where a user may enter a username and password to access user-only functions of RPS. In addition an information block 203 provides information on RPS and how RPS can help in various circumstances; and another information block 204 provides information on features and advantages of RPS.

Figure 3:
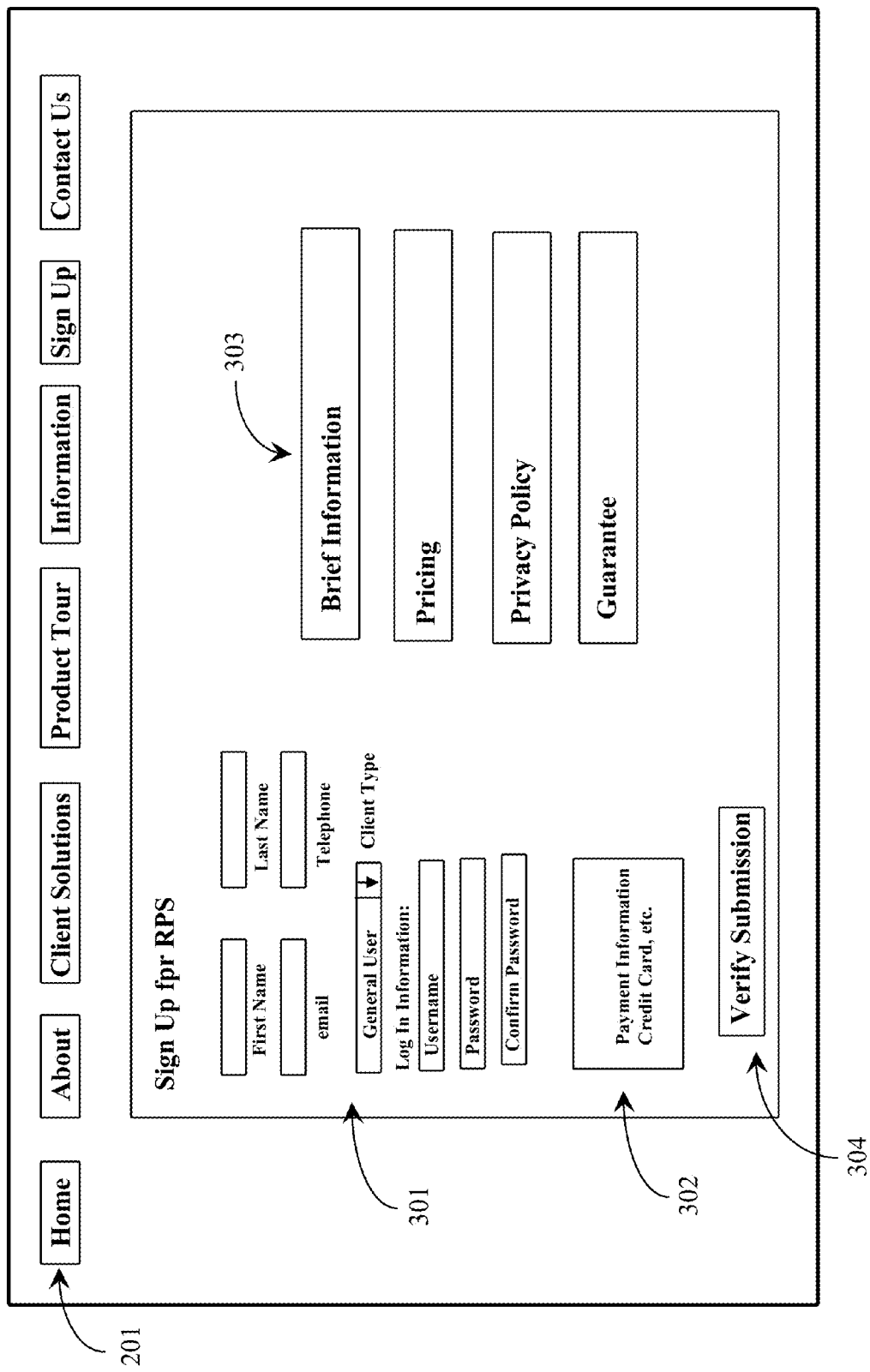
FIG. 3 is an illustration of a sign-up page in an embodiment of the invention.

The "Sign Up" link in menu bar 201 sends a user to a "sign up" page illustrated as FIG. 3. Menu bar 201 is still displayed so a user may navigate elsewhere on the web site. Entry fields 301 are provided wherein a user may enter name, contact information, type of user (drop-down menu) and preferred username and password for log-in. There is also an entry function 302 wherein the user may provide credit card or other means of payment for services desired to be purchased from RPS. An information block 303 provides information on such as pricing, privacy and guarantee. When a person has completed sig up, he or she may verify using button 304, and the system saves the user information for the new user in data repository 102 (FIG. 1).

Figure 4:
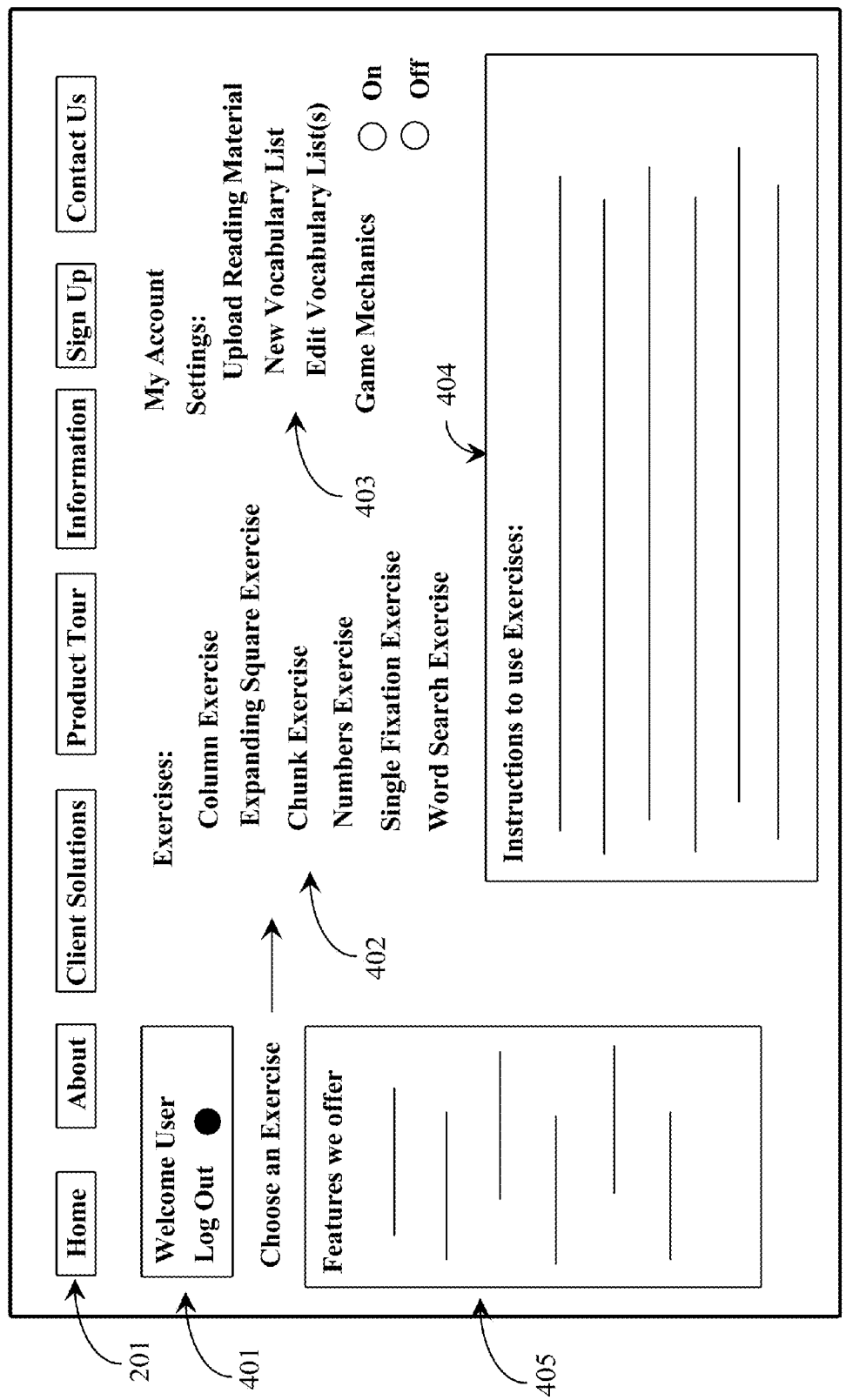
FIG. 4 illustrates a navigation page for a person (user) to use the RPS system.

Now when the user who is now a user of RPS navigates again to the home page, he/she may enter the user name and password in block 202 (FIG. 2), click OK, and be entered to the system to a navigation page illustrated as FIG. 4. On this page the user can access his/her account, upload reading material and perform other functions. In FIG. 4 a user Log Out function is activated by a button in box 401, and features of the system are explained in box 405. A user selects an exercise in column 402 (the text is activated as a link in each case), and the exercises are further described below with reference to other figures. Instructions to use the exercises are provided in box 404. Finally, a user may access his/her account and activate certain settings in column 403. The text naming each function is implemented as a link. Game mechanics, further described below, are turned on or off in this column as well.

Figure 5:
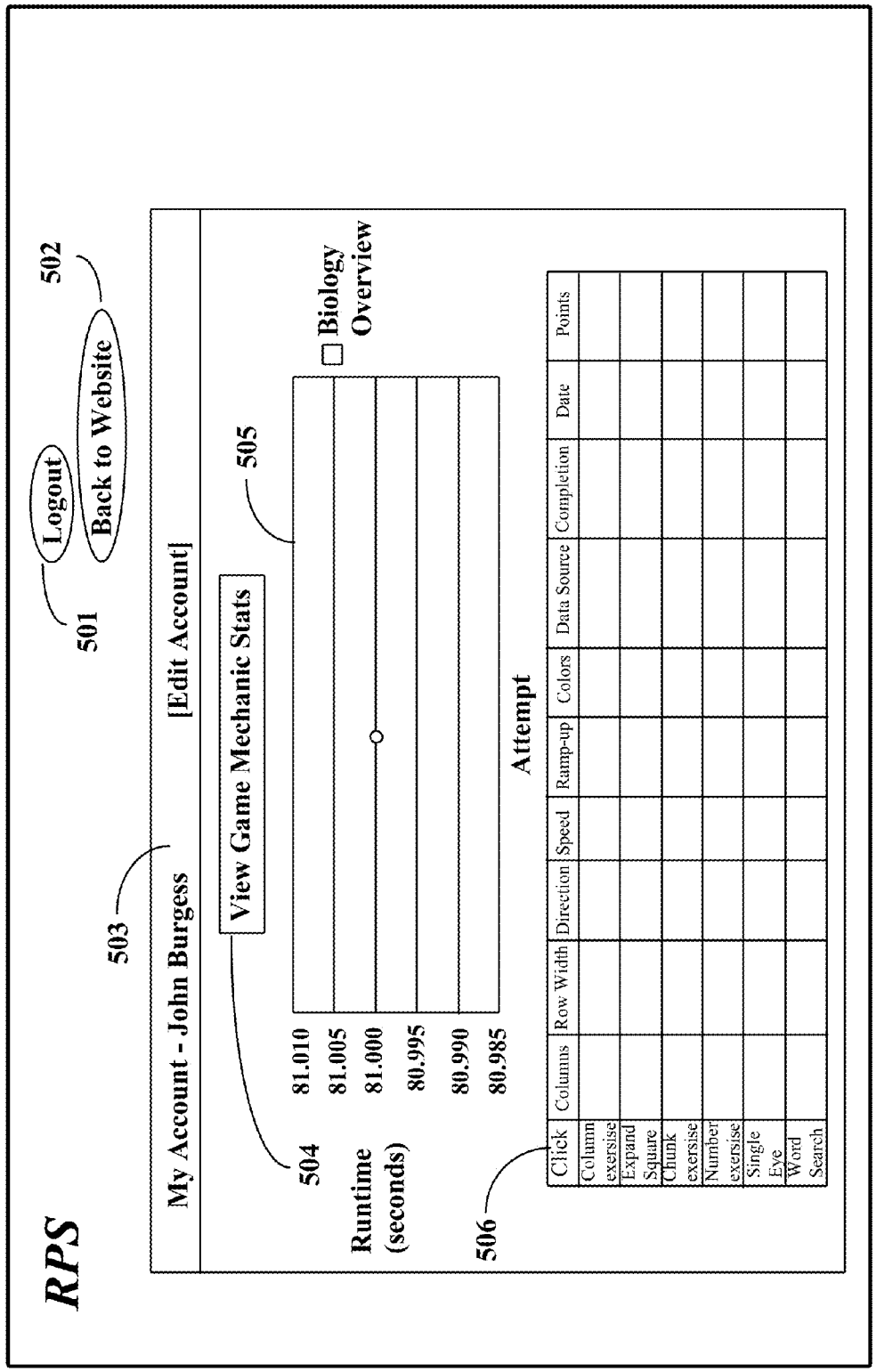
FIG. 5 illustrates an example of a personal account page for a user of the system of the invention.

FIG. 5 illustrates a page accessed by the "My Account" link in column 403 of FIG. 4. The My Account page has navigation links 501 and 502 that allow a user to Log Out or go back to the home page, respectively. A headline 503 indicates the user's name and has a link for the user to edit the account. On this page the user may view game mechanic statistics displayed in graphical form (505), and may click on specific exercises in column 506 to see settings and results for any one of the exercises completed.

If one selects to "Upload Reading Material" in the screen of FIG. 4, the screen of FIG. 6 appears. All of the unique exercises provided are implemented on reading material selected by the user, and may be material that the user provides by upload, or may be material provided by RPS. In the screen represented by FIG. 6 the user may enter a name for the material in field 601, and enter a filename and location in field 602, or alternatively browse for a file by selecting button 603. Button 607 enables upload of the material selected.

Material provided by RPS or uploaded is listed by the name (not necessarily filename) in list 604 under "My Material". The text for each name is a link to the actual material, which will be displayed by selecting the link. The user may also select material to delete in boxes 605, and delete the selected material by button 606.

Figure 7:
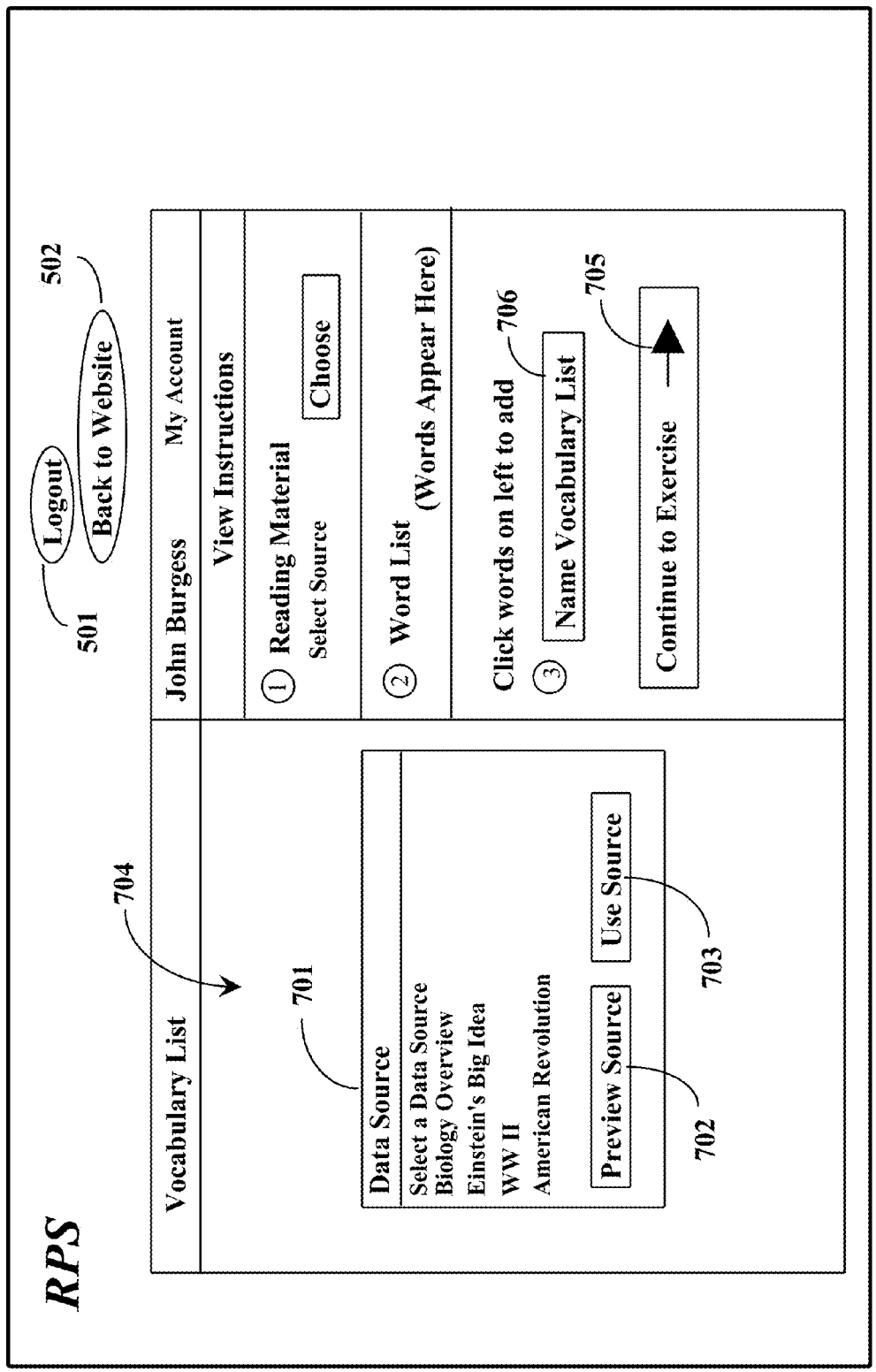
FIG. 7 is an illustration of an interactive interface as a page for a user to create vocabulary lists.

Selecting "New Vocabulary List" in the screen of FIG. 4 takes the user to the screen represented by FIG. 7. When this screen first appears, a floating widow 701 is presented in which the user may select a data source among the saved reading material for a vocabulary list. The user may highlight a source and preview the source by button 702, and select a source for use by button 703. Once the user selects a source for use window 701 disappears, and the selected reading material appears in panel 702 headed "Vocabulary List". Now the user may click on words in the selected reading material to add to a vocabulary list, which appear as selected under (2) Word List, and the user may name the list using entry field 706. As the user selects words, these words appear in a different font color for contrast.

After a new list is prepared the user may click on arrow 705 to go to a page that facilitates entry of definitions for each word selected in the vocabulary list. Each word is accompanied by a large entry field where the user may enter the definition, then there is a button "Submit Vocabulary List", which goes to a new page which displays each vocabulary list owned by the user, along with the definition for each word.

Figure 8B:
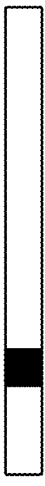
FIG. 8*b* is an illustration of additional parameter inputs for the page of FIG. 8*a*.
Figure 8B:
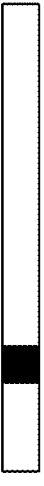
Figure 8B:
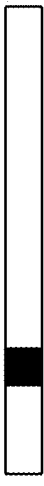

Referring back again to FIG. 4, when a user is ready for an exercise, that user may select an exercise in column 402. For example, selecting "Column Exercise" navigates to a page represented by FIGS. 8a and 8b. In the page of FIG. 8a the user may select reading material, as in the vocabulary list described above, and may set parameters for the column exercise. For example (2) Number of Columns, allows the user to set the number of columns from 1 to 4. In this example there are two columns. (3) Column width allows the user to set the column width, which in this example is set to 2 words. (4) Reading Direction allows the user to set the direction as Left to Right and Top to Bottom, or any other combination of horizontal and vertical direction.

Setting controls are continued in FIG. 8b, which may be considered as a continuation of the controls shown in FIG. 8a, for which the page height is not sufficient to display all of the controls. (5) Reading Rate allows the user to set the reading rate for the exercise. (6) Ramp Up rate allows the user to set the rate at which the Reading rate will be increased during the exercise. (7) Font Size is self explanatory. (8) Colors allows the user to set color from a considerable selection in the drop down menu shown, for Font, Background and Highlight.

Referring back to FIG. 8a, once the user has set all of the parameters, these will be operative until the same user resets one or more parameters. The user may now select Continue to Exercise arrow 705. The selected reading material will be displayed as columns in pane 801 according to either the default parameters or the parameters the user has set.

The Column Exercise is designed to improve motor skills, but also helps improve sensory skills, and once these motor and sensory skills are mastered, helps cognitive skills as well.

As much as 90 percent of the reading one does requires silent-sight reading, instantaneous recognition and understanding of words (word processing at brain speed), large eye movement jumps (macro-saccades), word chunking (parallel word processing), and scanning (rapid discrimination and differentiation of information).

The Column Exercise defaults are set to 2 columns and a 1 word width. When the user initiates the exercise the first word in the first column is highlighted, then the first word in the second column, then the second word in the first column, and so on. The highlight change is at the rate set by the user, or the default rate. If the speed it too fast or too slow, the user may click the Back button and decrease it or increase the column width or highlight rate. Since the point is to improve eye motor skills, the user should endeavor to move the eyes fluidly with the highlighter. The user may increase or decrease the number of columns and words. Increasing the number of columns makes the exercise more like regular reading. Decreasing the number of columns to 1 makes the exercise more like scanning a column. The user may wish to increase the number of words the user's brain can process in parallel, in which case it is needed to increase the column width. The user should increase the speed as words are added to the column width. A good rule of thumb is 100 words per minute for each word added to the column width.

As with all RPS exercises, the user selects the Reading Material, which increases interest and focus. The user can kill two birds with one stone by uploading reading required for school or for work. Note to Teachers: A teacher may upload assigned reading material through the Teacher Control Panel.

For ease of use, RPS default settings were carefully chosen so the average person can begin using the exercises by choosing their Reading Material and clicking the Continue to Exercise button without making any other adjustment to the settings. As described further below, users are encouraged to find the settings that maximize performance.

The user chooses the Number of Columns, which trains the eyes to move fluidly across the page and up and down columns. The user controls the amount of horizontal eye movement by selecting the Number of Columns. When the user selects the single column setting, the user can practice scanning lists and the kind of reading that is most effective with newspapers and magazines. The default Number of Columns is set to 2.

The user chooses the Column Width, which allows the user to read in chunks of 1 word to 5 words. The more words the user can process simultaneously, the more information the user can absorb with each eye movement in a given period of time. The user should increase the Column Width as the user progresses. The default Column Width is set to 1 Word.

The user controls the Reading Direction, which provides an opportunity to train the user's eyes to move in ways that are useful, but in ways that are not taught in school, such as scanning up and down a column, moving the eyes from left to right as in normal reading and from right to left. The default Reading Direction is set to Left to Right and Top to Bottom.

The user sets the Reading Speed, which allows the user to increase and decrease the rate of information absorption. The default Reading Speed is set to 180 WPM.

The Column Exercise has a Ramp Up Speed, which ensures that the user is always pushed to increased performance. The Ramp Up Speed gradually increases the rate as the user progresses through the passage. For instance, at a Ramp Up Speed of 50% and a Reading Speed of 200 WPM, the exercise starts at 200 WPM and gradually increases to 300 WPM by the end of the passage. The default Ramp Up Speed is set to 50%.

The user can set the Font Size, which reduces the effects of visual acuity and increases the effects of the exercise on the skill the exercise develops. In school it may be taught that smaller font is better. This is not necessarily true, so the user should not hesitate to increase the font size if it helps to do the exercises better. Once the user begins acquiring the skills, the Font Size may be decreased if desired. The default Font Size is set to 14.

The user controls the Font, Background, and Highlighter Colors. People have varying degrees of color and color contrast sensitivity. Using RPS exercises is about improving the neural pathways for specific reading skills the exercise addresses. It is not about sticking to standard color schemes. One should choose the Colors that seem to facilitate development of reading skills. The default Font, Background, and Highlighter Colors are set to medium blue, light blue, and black respectively.

Once the column exercise finishes, that is, the highlighter has proceeded through the columns to the end, the user may click the Back button to do the same exercise over again The Back to Web Site button allows the user to go to a different exercise.

Game mechanics operate in the column exercise when enabled, as follows:

Timer—The timer measures the amount of time it takes to go through the entire passage.

Target Word—The target word is chosen randomly from the passage. When the target word is highlighted, the user has 3 seconds to hit the Enter key to earn points. If the Enter key is not hit, points are deducted. If the user hits the Enter key inadvertently, points are deducted.

Multiple Target Words—To increase difficulty, a user will be able to increase the number of target words.

Number of Occurrences—This is the number of times the target word appears in the passage.

Points Counter—The points counter displays the number of points the user has accumulated. The points are normalized to −100 and +100 so that a comparison can be made from iteration to iteration.

Bonus Points—Bonus points will be added to a score for difficulty and time.

Enter Key—An Enter key is displayed on the screen so the RPS game mechanics can be used on a mobile device.

Exercise Summary—The Exercise Summary appears when the highlighter reaches the end of the passage. It displays the time, settings, and points.

Figure 9A:
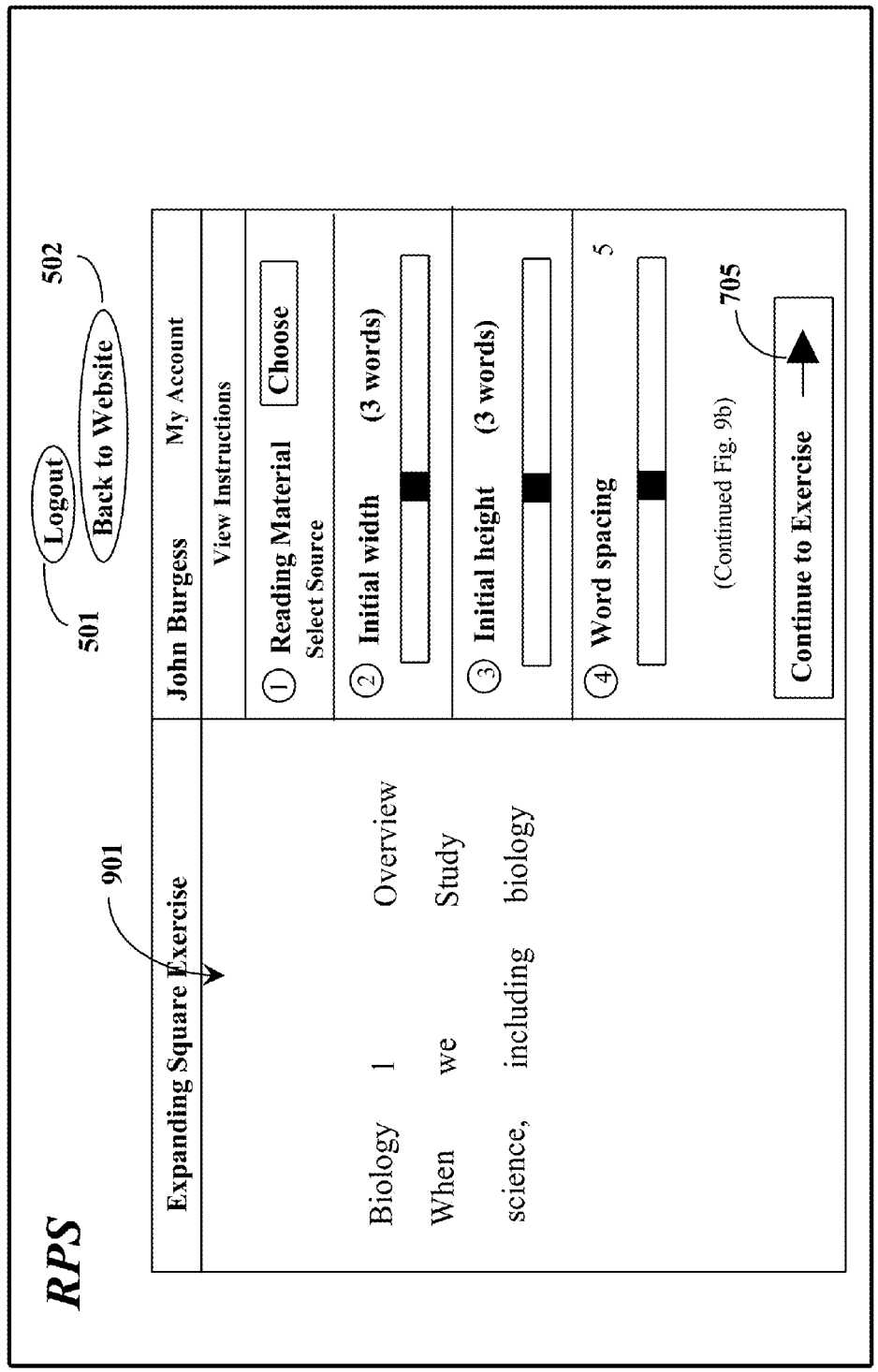
FIG. 9*a* is an illustration of a control page for an expanding square exercise in an embodiment of the invention.

Referring back to FIG. 4 again, a user may select the Expanding Square Exercise in column 402, which navigates to a page represented by FIGS. 9a and 9b. In FIG. 9a the user may select reading material at (1), just as described above for the column exercise, and a portion of the material selected will be displayed in an expanding square pattern in pane 901 according to default parameters or parameters set by the user. Initial width may be set at (2), and is shown in this example as 3 words. Initial height may be set at (3), and is shown as set at 3 words as well. Word spacing is set at (4) and is 5 in this example. Referring to FIG. 9b, which is a continuation of FIG. 9a, explode rate may be set at (5), and is shown as set for 50. Iterations are set at (6) and this is set for 2. Font size is set at (7) and colors at (8) for Font color and background color.

The Expanding Square Exercise is primarily designed to improve sensory skills, especially Peripheral Visual Perception (PVP). When this exercise is mastered, it helps improve cognitive skills as well.

Expanding Peripheral Visual Perception (PVP) is important because the more words the user can decode, both horizontally and vertically, the more information the user can absorb with each eye fixation. The Expanding Square Exercise starts with the words together at the center of the user's vision, then expands them into peripheral vision. This is a kind of reverse engineering of the brain's ability to decode words in the peripheral vision space by having the brain decode those words in the region of the clearest vision. The brain already knows what words are there and learns to perceive words better in the periphery.

The Expanding Square defaults are set to a width of 2 words and a height of 2 words, but in this example these parameters have been reset to 3 and 3. The user may adjust these parameters at any time. Since the goal is to increase the number of words the user's brain can process in parallel, 3×3 is a goal, but perhaps not a good starting point.

As with all RPS exercises, the user selects the Reading Material, which increases interest and focus. For ease of use, all RPS default settings were carefully chosen so the average person can begin using the exercises by choosing their Reading Material and clicking the Continue to Exercise button without making any other adjustment to the settings. The user is encouraged to find settings that maximize performance.

The user chooses Initial Width, which is the number of words displayed horizontally. The more words the user can process simultaneously, the more information the user can absorb between each eye movement in a given period of time.

The user chooses the Initial Height, which is the number of words displayed vertically. The default Initial Height is set to 2 Words, but is shown in this example as 3 words. The user sets the spacing. The default Word Spacing is set to 5.

The user sets the Explode Rate, which is the rate at which the words expand in the pattern. The default Explode Rate is set to 50. The number of Iterations is the number of times the same words repeat on the screen. The default Iterations is set to 1.

The user sets the Font Size, which reduces the effects of visual acuity and increases the effects of the exercise on the skill the exercise develops.

The colors may be varied. People have varying degrees of color and color contrast sensitivity. The user should experiment with the color pre-sets or create different color combinations. Using RPS exercises is about improving the neural pathways for specific reading skills the exercise addresses. It is not about sticking to standard color schemes.

When all is set, the user may initiate the exercise by selecting arrow 705. The user is then presented with a target word from vocabulary, and instruction to press the enter key each time the target word appears. The exercise starts with the grouping of words shown in pane 901 in FIG. 9a, and expansion occurs at a rate set in the parameters. That is the pattern explodes to the size of the pane. Then the next group of words in the selected reading material (in this case the next 9 words, are displayed in the unexpanded square, which is then expanded, and so on, until the exercise reaches the end of the reading material. Points are awarded for correctly recognizing the target word as the exercise proceeds. The exercise may be repeated by using the Back button. A different exercise may be selected by the "Back to Website button.

Game mechanics operate in the expanding square exercise when enabled, as follows:

Timer—Same as for column exercise.

Target Word—Same as for column exercise with the exception that the action is triggered by the word appearing and not when it is highlighted.

Multiple Target Words—Same

Number of Occurrences—Same

Points Counter—Same

Enter Key—Same

Exercise Summary—Same

Figure 10A:
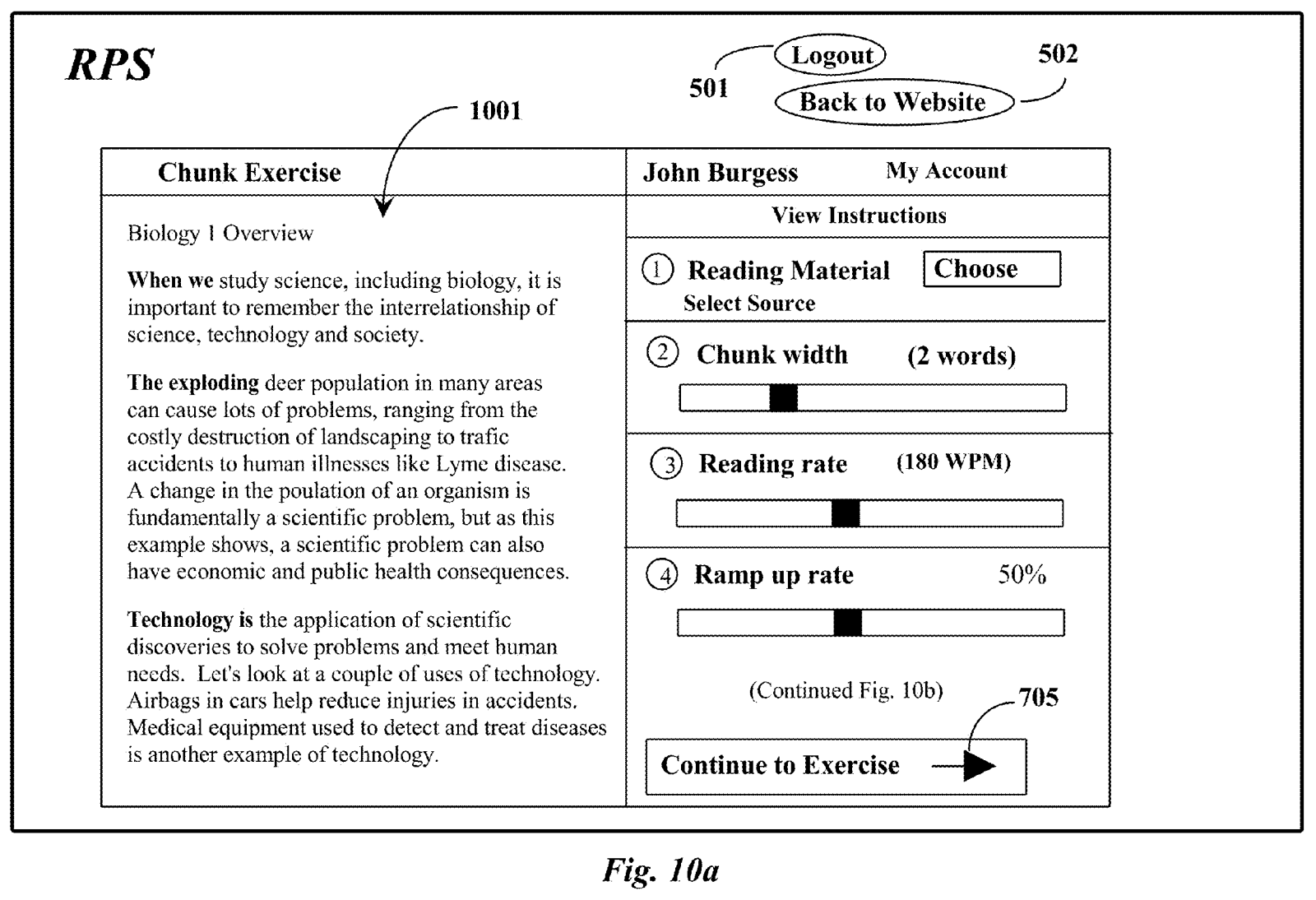
Figure 10B:

Referring again to FIG. 4, when a user selects "Chunk Exercise" in column 402 the page represented by FIGS. 10a and 10b appears. In the page represented by these figures the user may select the reading material as described elsewhere above. The user may also set in (2) a "chunk width", in this case 2 words. The user may also select a reading rate (3), shown here as 180 words per minute, a "ramp up" rate, shown here as 50%, and may select font size and colors for font, background and highlight.

The selected reading material appears in pane 1001 as shown, with two words highlighted at the beginning of each paragraph. The user initiates the exercise as before, by selecting arrow 705.

The Chunk Exercise is designed to improve both motor and sensory skills and when it is master, cognitive skills as well. This exercise is the most like normal reading. The Reading Material is displayed as you would normally see it and the highlighter highlights the words in chunks.

When reading, your eye must be stopped or fixated in order for the eye to clearly see the words and the brain to properly decode it. When one fixates on each word, the eyes are doing more work than they need to and this is a very slow way to read. If one can read two words at once, eye strain is cut in half, and twice as much information is absorbed in the same amount of time. Chunking three and four words at a time produces even greater benefit. The user should focus on eye movement, seeing the words clearly will follow proper eye movement and meaning will follow seeing the words clearly. The Chunk Exercise helps develop eye tracking and synchronization skills and trains the eyes to move fluidly across the page under normal reading conditions.

The Chunk Exercise default is set to 2 words per chunk. When the user is comfortable, the chunk width may be increased to increase the challenge and develop ability to absorb more information.

The user chooses the Chunk Width, from chunks of 1 word to 5 words.

The Reading Speed controls the rate of advance of the highlighted chunks successively through the reading material, which allows the user to increase and decrease the rate of information absorption. The default Reading Speed is set to 180 WPM. The Ramp Up Speed gradually increases the highlight progression rate as the exercise proceeds through the reading material. For example, at a Ramp Up Speed of 50% and a Reading Speed of 200 WPM, the exercise starts at 200 WPM and gradually increases to 300 WPM by the end of the passage. The default Ramp Up Speed is set to 50%.

To do the exercise again, the user may click the Back button. To do a different exercise, the user may click the Back to Web Site button.

Game mechanics operate in the chunk exercise as follows:

Timer—See this section in Column Exercise above.

Target Word—See this section in Column Exercise above.

Multiple Target Words—See this section in Column Exercise above.

Number of Occurrences—See this section in Column Exercise above.

Points Counter—See this section in Column Exercise above.

Enter Key—See this section in Column Exercise above.

Exercise Summary—See above.

Referring back again to FIG. 4 the user may select "Numbers Exercise" in column 402, which opens a page represented by FIG. 11. In this exercise a matrix of numbers, four by four, is presented in pane 1101, with one of the 16 numbers placed in a circle in the center of the matrix, as shown. The user may set parameters for spacing (1), Font size (2), and for colors (3). As before the user initiates the exercise by selecting arrow 105.

The Numbers Exercise is primarily designed to improve sensory skills, specifically Peripheral Visual Perception (PVP) and when it is mastered, cognitive skills as well. Expanding Peripheral Visual Perception (PVP) is important because the more words one can decode, both horizontally and vertically, the more information one can absorb with each eye fixation. The Numbers Exercise starts with a 4×4 matrix of 16 numbers. One of the numbers appears in a circle in the center. The idea is to stare at the number in the center and use peripheral vision to click on the same number in the matrix. Once the user clicks on the correct number in the periphery a new number appears in the center and the exercise continues. When all 16 numbers have been correctly selected, the exercise ends. Numbers were chosen for this exercise because number symbols are easily decoded by the brain. The goal is to be able to see all 16 numbers simultaneously. The Numbers Exercise default is set to a spacing of 15. In an alternative embodiment sixteen words are used rather than numbers, and the exercise proceeds as for the numbers. Other variations may be a different matrix, such as three by three, for example.

To do the exercise again, the user may click the Back button. To do a different exercise, the user may click the Back to Web Site button.

Game mechanics operate in the numbers exercise as follows:

Timer—The timer starts as soon as the exercise page appears. The lower the time, the higher the score.

Exercise Summary—See above.

Figure 12A:
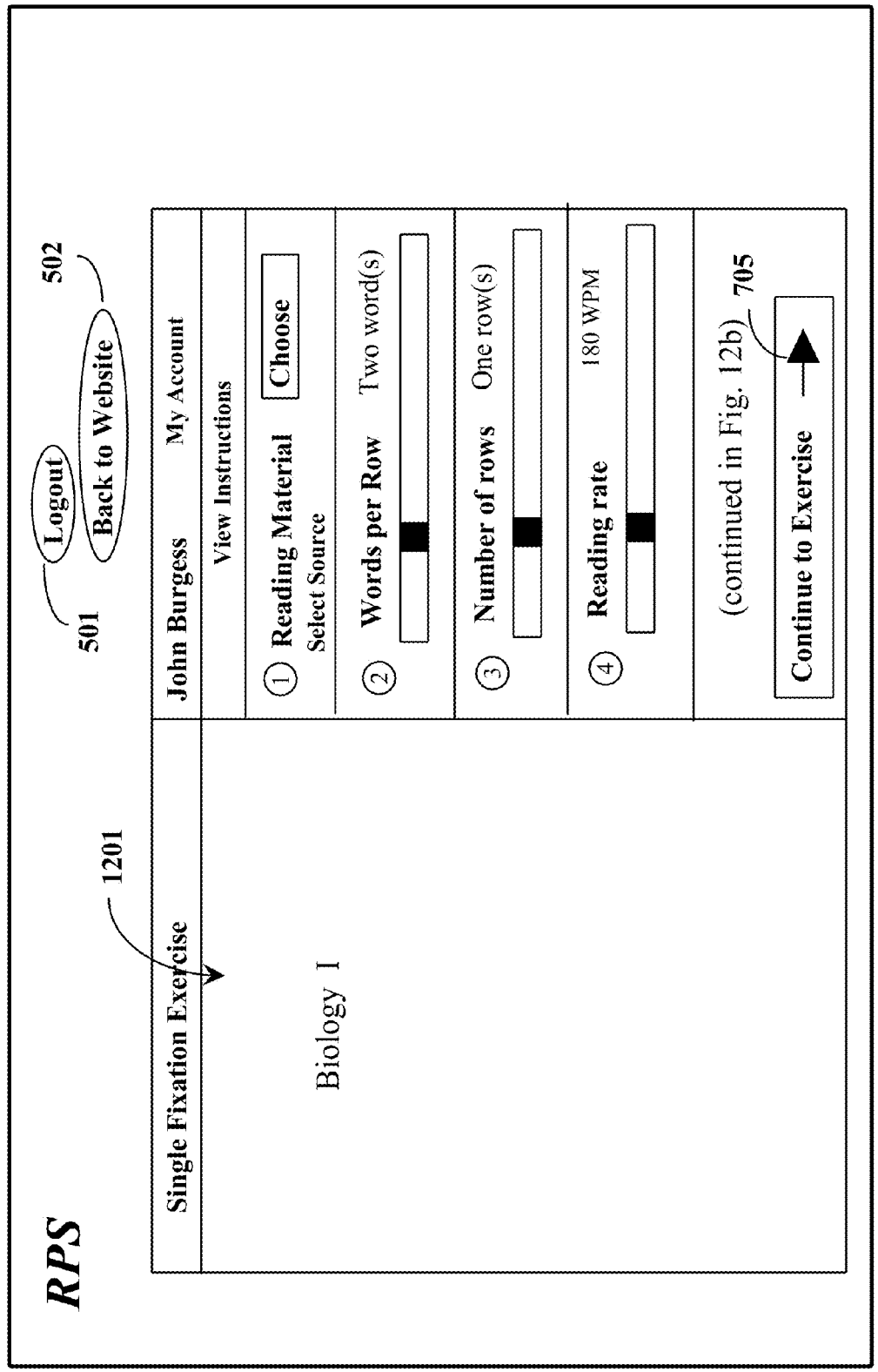
FIG. 12a is an illustration of a control page for a single fixation exercise in an embodiment of the invention.
Figure 12B:
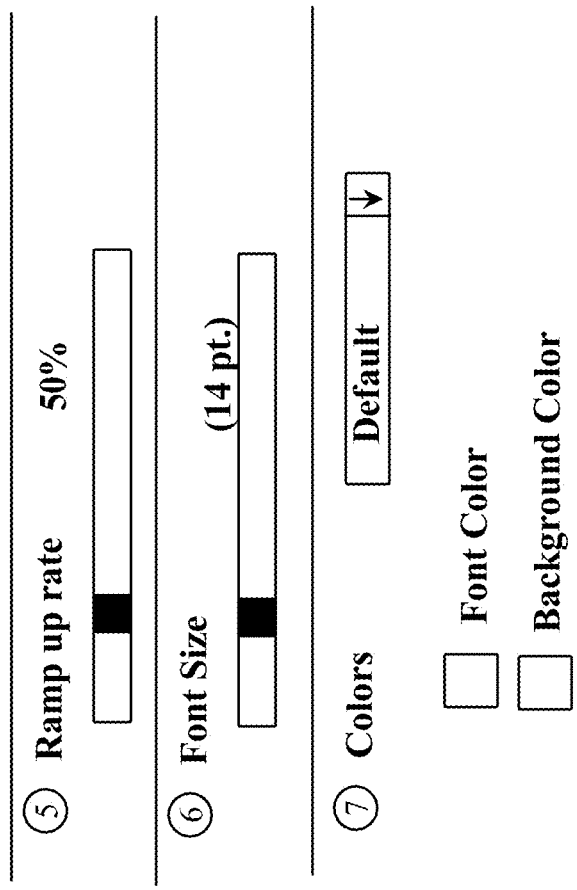

Referring once again to FIG. 4, a user may select a Single Fixation Exercise in column 402, which will navigate to a page represented by FIGS. 12*a* and 12*b*. The user may select the reading material as before at (1), and set parameters as (2) Words Per Row, (3) Number of Rows, (4) Reading Rate, (5) Ramp Up Rate, (6) Font size, and (7) Colors.

The Single Eye Fixation Exercise is primarily designed to improve sensory skills, specifically Peripheral Visual Perception (PVP) and the Magnocellular and Parvocellular Systems for visual processing. When it is mastered, it helps improve cognitive skills as well. Like its name, when doing the Single Eye Fixation Exercise, you will fix your eyes in one position as the words of the passage appear on the screen. The words from the reading material will appear in the pattern and size you have set in the parameters. In this example, the pattern is set to two words per row, and one row, so words from the selected reading material appear in groups of two words in one row at the rat set, and the ramp up applies as the exercise continues. When the user starts the exercise with arrow 705 a start screen appears with a key word. The user is to use the Enter key each time the keyword appears in the progression through the reading material. Points are awarded, and at the end of the exercise the user gets a summary sheet of performance for the exercise just completed.

The magnocellular system in the human brain is a pathway of fast acting neurons that transmit general information about what is seen. The parvocellular system is a slower acting pathway that transmits more detailed information about what is seen. The Single Eye Fixation Exercise helps to eliminate processing defects due to motor functioning and flashes words in rapid succession, thus causing the magnocellular and parvocellular systems to fire repeatedly and quickly. This also exercises the "clearing" function in the rods and cones that some scientists believe contributes to dyslexia. The Single Eye Fixation Exercise can be set to increase the number of words displayed horizontally and vertically to help increase your Peripheral Visual Perception (PVP). This is an excellent exercise to use to catch up on your reading.

Game mechanics for the single fixation exercise operate as follows:
Timer—See above.
Target Word—See above.
Multiple Target Words—See above.
Number of Occurrences—See above.
Points Counter—See above.
Enter Key—See above.
Exercise Summary—See above.

Figure 13A:
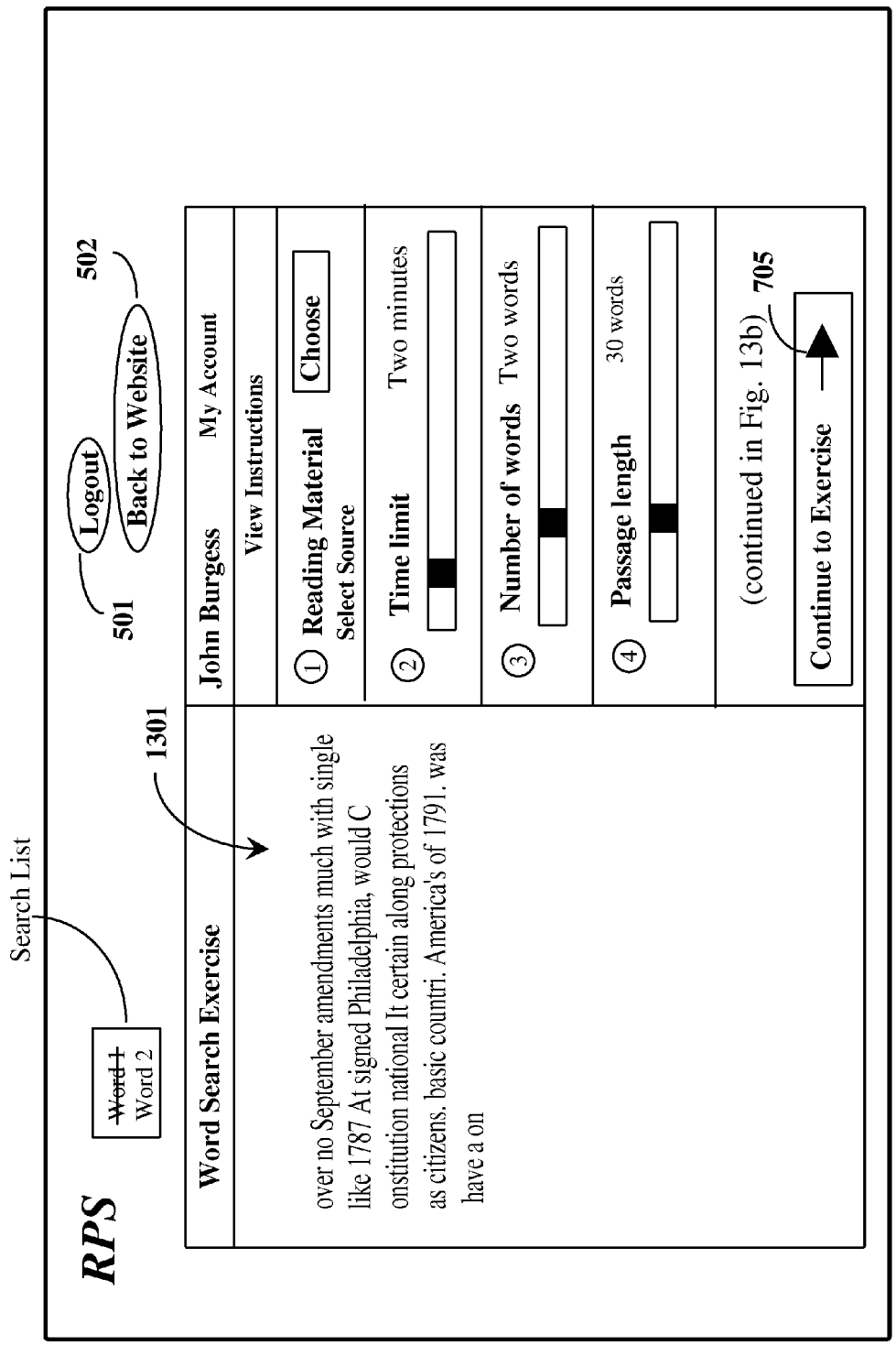
FIG. 13a is an illustration of a control page for a word search exercise in an embodiment of the invention.
Figure 13B:
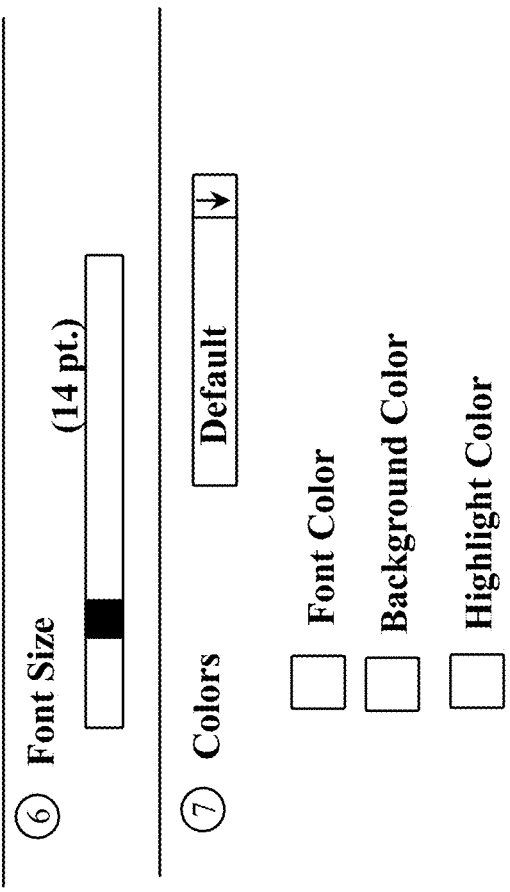

Referring once again the FIG. 4, a user may select Word Search Exercise in column 402, which will navigate to the page represented by FIGS. 13a and 13b. As in exercises previously described, the user selects reading material to be used for the exercise from stored choices. In this example a passage about the American Constitution has been selected.

The user selects a time limit at (2), a number of words at (3) and a passage length at (4). The passage length controls the overall number of words that are displayed in panel 1301, and the number of words parameter sets the number of words that will be searched. Notice that the words displayed in panel 1301 are not in any rational order or in the order they are in the selected passage. Moreover, the total number of words displayed from the selected reading material is the number, in this case 30, set by the user.

When the user initiates the exercise by arrow 705 a test panel appears showing the passage in the jumbled order of panel 1301, and two words, arbitrarily selected from the passage by the RPS system, are shown in a separate position. The challenge is for the user to search the displayed passage for each one of these two words, and to "click on" each word when found. The time limit is that set by the user, in this case two minutes. As each word is found and clicked, that word in the separate display is crossed out.

When the user has clicked on all the words to be found, the system display the result, showing the time the user took to find all the words.

The Word Search Exercise is designed to exercise all motor, sensory, and cognitive skills at the same time. The Word Search Exercise can be addictive. The Word Search Exercise requires all of the user's cognitive skills, fluid eye movements in all directions, sensory decoding, and cognitive recognition. It also helps develop word visualization. The user sets the challenge by choosing the Number of Words to search, the Passage Length and the Time Limit. Increasing the Number of Words and Passage Length increases the difficulty.

The user should try different search patterns, left to right, right to left, top to bottom, bottom to top, S curves, W curves, and clockwise and counter-clockwise spirals. As motor and sensory skills improve and peripheral visual perception and ability to visualize words increases, the words will "start jumping off the page".

The Word Search Exercise defaults are set to searching for 2 Words in a passage of 30 Words for 1 minute.

As with all RPS exercises, the user selects the Reading Material, which increases interest and focus.

Game mechanics for the word search exercise operate as follows:
This exercise was designed as a game from the beginning. It requires user input.
Timer—See above.
Exercise Summary—See above.

There are a broad variety of other exercises that may be implemented in an RPS system in embodiments of the present invention. For example:
Vertical Motor Exercise (VME)

A Vertical Motor Exercise may be implemented, and is primarily designed to improve motor skills, but it also helps improve sensory skills and once these motor and sensory skills are mastered, helps cognitive skills as well. In such an exercise words are highlighted. The user chooses Reading Material. Chunks are displayed in an over/under arrangement. When two chunks are displayed, when the exercise starts, the first chunk is displayed on the top and the second chunk is displayed on the bottom. The highlighter highlights the top chunk, when the highlighter shifts to the bottom chunk, the top chunk changes to the third chunk of words. When the highlighter shifts to the top chunk, the bottom chunk changes to the fourth chunk and so on. The setting for number of chunks displayed vertically. There is a setting for number of chunks, or chunk width, and for spacing between chunks.

Reading Pattern or Direction can be set for different patterns. For instance when there are 3 chunks displayed, the highlighter can highlight the top chunk first, then go down, and down, then skip back to the top. When there are 3 chunks displayed, the highlighter can highlight the bottom chunk first, then go up and up, then skip back to the bottom. The highlighter can start at the top then go down, down, then up, up, then down, down, and so on. The reading rate can be varied, as well as the ramp up rate. There are settings for font size and colors as well.

Ricochet Exercise
Words are flashed and users type what they see. If the two match, they earn points. If the two do not match, they lose points. Words are flashed very quickly, e.g. 20-100 ms.

Binocular Vision Exercise
Using perspective, words are moved toward and away from the viewer.

Hand-Eye Exercise
Word appears on the screen, user moves the pointer and clicks on it. Timed Variations in a Vocabulary Module
There are many options in a vocabulary module. For example user opens an RPS reading file and clicks on every word they do not know. This populates their Personal Vocabulary List (PVL). They type or copy/paste the definitions for each word. The PVL becomes available as a reading file for use in the RPS exercises.

The current level of game mechanics is to visually recognize words. Another level may be to recognize thoughts and meaning. In other words, the passage will be read within the RPS exercises and questions will be asked at the end. Or perhaps there can be pauses where questions are asked about what was just read. Answering correctly gains points, incorrectly, loses points.

There may be a Progressive Flash Card System (PFCS). In this system users open their PVLs in the PFCS. The flash card system shows the word and they have to type the definition or vice versa. As they get the words/definitions more and more correct, those words become less and less frequent in the stack.

There may be Vocabulary and/or Comprehension Games.
In a Word/Definition Match, words are on one side, definitions on the other. The user has to match the word to the correct definition.

There may a concentration exercise in which is like a card game, but with words and definitions on the cards. A Hear and Type exercise works by hearing the definition, then typing the word and vice versa. See and Type works similarly. In a Cloze Test sentences are displayed with blanks, and the user has to fill in the blanks with the proper words. A Word Invaders exercise has words dropping down from the top. The user has to shoot the word that corresponds to the definition. In a Drag and Drop exercise the user drags the word to the definition. In a Pin the Word on the Definition exercise the user has to pin the word on the definition. There may be a Word Darts game where a user throws word darts at the definitions and vice versa. In an Angry Words exercise the user shoots words from a sling shot at definitions. In a Relay Race the user hands words off to the definition. In a Card Games exercise the user adapts words and definitions to word games.

In a Board Games exercise the user adapt words and definitions to board games. in a Video Games exercise the user adapts words and definitions to video games. In a First Person Shooter Word Game exercise, the system displays the definition, and the user shoots the correct word. In a First Person Race Car Word Game the user races around a track and runs over words that match a displayed definition. Word Poker operates like Texas Hold 'Em. Other versions can be explored. Word Hero operates like Like Guitar Hero. In Word Chess, possible moves are limited by whether or not the user knows the definition of the word corresponding to that square. In Word Checkers possible moves are limited by whether or not the user knows the definition of the word corresponding to that square. In Word Battleship possible moves are limited by whether or not the user knows the definition of the word corresponding to that square. In Definition Scrabble, the user plays Scrabble, but with definitions. In Word Slapjack the word for the definition appears and the user slaps it. Word Uno is played with cards with words on them. A Spelling Module uses word/letter scramble, teaching the user how to recognize the correct spelling of words/the correct arrangement and number of letters.

In a Word/Letter Scramble exercise the system takes a passage and scrambles the letters in each word except for the first and last letter. In a Smooth Pursuit Exercise the system displays a passage with additional space between the lines, and run a track bar with part above and part below the line along the line in a smooth motion. The eye follows the track bar while the words pass through the field of vision. Settings include different patterns, e.g. Runs from left to right to the end of the line, then reappears at the left end of the next line, etc., Runs from left to right to the end of the line, then skips down to the next line at the right end and continues from right to left, and Up and down motion from left to right and right to left.

In a Contracting Square Exercise the system incorporates opposite motion to the Expanding Square Exercise described above. Words first appear expanded, then contract to the center. In a Moving Words Exercise the system displays words, then moves them. In a Peripheral Vision Exercise central vision is masked out using color and shade to force the use of peripheral vision. In a Font Vision Exercise the system displays words, then change the font. This improves the brain's ability to encode/decode words in different fonts. In a Color Vision Exercise the system displays words, then changes the color combination. This improves the brain's ability to encode/decode words in different colors. In an S-Reading Exercise the user reads the first line from left to right and the next line from right to left and so on. This is a much more efficient way to read. Finally, in a Letter-Number Name/Letter Sound/Sight Word Exercise (RPS FBR) a letter appears, and the user can mouse over the letter and hear its name. Then the letter appears in a list and the user has to click on the letter last seen. This works the same for numbers. When words are involved, not only the sound of the letter, but also the sound it makes in the word are used. The user hears how the word is properly pronounced. This also improves spelling.

This is a partial list of additional exercises and games that may be implemented in RPS.

In a different aspect of the present invention physiological data derived from as person using the RPS system through a browser may be provided to the RPS system while the user performs an exercise, such as one of the several exercises described above, and that input on the server side may be incorporated into the testing procedure, creating, for example, adjustments in the parameters of certain tests or performance of the RPS system in its output to the user in the interactive interfaces provided.

Figure 14:
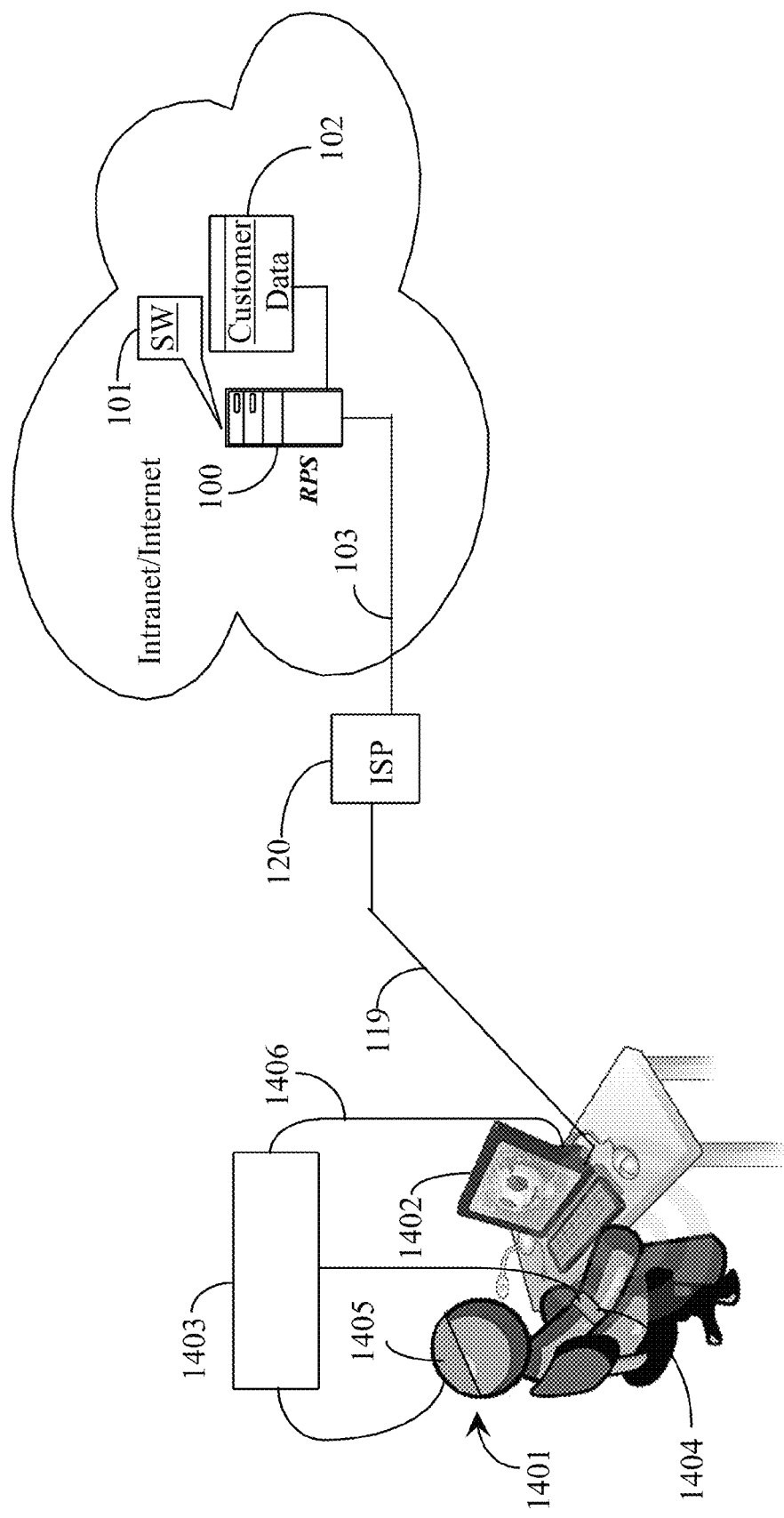
FIG. 14 is a diagrammatical architecture diagram for a system incorporating physiological monitoring of a person while interacting with the system in an embodiment of the invention.

FIG. 14 is a diagrammatical representation of such a situation wherein a user 1401 is illustrated as using a computing appliance 1402 to interact with the RPS system in an embodiment of the present invention, through a browser (not shown) executing on appliance 1402. Appliance 1402 acts through path 119 and an Internet Service Provider (ISP) 120 (see FIG. 1), and through Internet backbone 103 with RPS server 100 executing software 101 in the Internet network. All of the server-side elements are the same as in FIG. 1.

Sensor 1404 (on the user's arm) and/or sensor 1405 engaged to the user's head, provide input to a monitoring system 1403, which is also a computerized appliance executing software, enabled to process data from the sensors engaged to the user, and to output data to appliance 1402 by path 1406. Software executing 1402 operates to provide the physiological data input from monitoring system 1403, and provides that data to Server 100 by path 119 and ISP 120 to server 100 by, in one embodiment, opening a separate Internet connection. In other embodiments the physiological data may be provided to server 100 in other ways, known in the art.

Data from monitor 1403 provided through appliance 1402 to server 100 while user 1401 is interacting with the RPS system as described above, to exercise according to one of the exercises described herein, may be used by server 100, through software 101, to adjust test parameters and display parameters in the interactive interface displayed on appliance 1402 by the user's browser. For example, simple physiological data collected in near real time might be used to speed up or slow down a display rate in an exercise.

In one embodiment sensor 1405 may represent one of an electroencephalograph (EEG), a magneto-encephalograph, a functional magnetic resonance imaging (FMRI) sensor, or a positron emission tomography (PET) sensor. In individual ones of these situations, the data sensed may be data related to the user's brain activity, and summary and derived data from the sensed data may be sent to server 100, where that brain activity data may be used to adjust parameters in ongoing tests.

In at least one embodiment server 100, through software 100, is enabled to adjust parameters in tests in a feedback-looped manner, wherein data arriving at server 100 is used to alter a test parameter, and data arriving shortly afterward is used to evaluate whether the adjustment made accomplished an intended purpose.

Further to the above, brain scanners can be used in other ways to Improve Reading and Writing. For example, the system might use brain scanning methods such as EEG, fMRI, PET, MEG, etc. to provide feedback to improve functioning in those areas of the brain responsible for reading and writing. As fidelity increases, brain scanning methods can be used to scan word images for reading and writing improvement and writing in general.

Reading involves the development of word schema. Brain scanners may be used for biofeedback in improving the brains ability to form word schema. Brain scanners can be used for biofeedback in developing vocabulary. Brain scanners can be used for biofeedback in improving spelling.

In addition brain scanners can be used to write. Brain scanners can be used to read word schema to produce written words. They can also be used to improve the ability to form schema. Brain scanners can also be used to edit. Brain scanners can be used to read word schema to correct written words.

In another embodiment a sensor may be employed as an eye tracking device, also connected to sensor monitor 1403. The sensor will provide data related to eye movement during reading exercises to the server side, and sounds/music will be provided to the user through a headset or speaker system to give feedback for efficient and proper eye movements during reading. If the eyes are not moving efficiently and properly, the music will sound distorted. When the eyes move fluidly and rhythmically, the music will sound as it would normally.

It will be apparent to a skilled artisan that the descriptions provided herein, following the figures provided and referenced in the specification, are examples of practice of the invention, and are not strictly limiting. Alterations may be made in many of the descriptions that will fall within the spirit and scope of the invention. The invention is limited only by the claims that follow.

The invention claimed is:

1. A system comprising:
   a computerized server connected to a network and coupled to a data repository and a non-transitory medium; and
   software executing on the computerized server from the non-transitory medium, the software providing a word search exercise in an interactive interface accessed by a user connected to the computerized server via a browser link, the word search exercise comprising:
   a first mechanism in the interactive interface enabling the user to select reading material for the word search exercise from stored choices;
   a second mechanism in the interactive interface enabling the user to select a word length for a passage of the reading material for the word search exercise;
   a third mechanism in the interactive interface enabling the user to set a time limit for the word search exercise;
   a fourth mechanism in the interactive interface enabling the user to select a number of words equal to or greater than two to be selected from the passage to populate a search list; and
   a mechanism enabling the user to start the word search exercise;
   wherein, upon the user selecting to start the word search exercise, the system displays the passage limited to the selected word length in a first window panel in the interactive interface, with words in the passage rearranged in a random order, the system selects the words from the passage equal to the number of words for the search list set by the user, the number of words in the search list different from each other in spelling and meaning, the system displays the number of words selected for the search list in a second window panel separate from the first window panel, the user then chooses a first word in the search list and clicks on the first word each time it appears in the passage, wherein the words in the passage have been rearranged in the random order, the system displays the first word in the search list with a strikethrough when and if the user clicks on every instance of the first word in the passage, the user chooses a second word in the search list and clicks on the second word each time it appears in the passage, the system displays the second word in the search list with a strikethrough when and if the user clicks on every instance of the second word in the passage, and the user continues until all words in the search list are displayed with strikethroughs, at which time the word search exercise ends, or until the timer reaches the time limit;
   wherein, once all words in the search list are indicated as found, the user is enabled to repeat the word search exercise with a second search list of words, with different words than previously selected in the search list but of a same number.

2. The system of claim 1 wherein the user is enabled to upload the reading material to be stored for use by the system in word search exercises.

3. The system of claim 1 wherein the user is enabled to set font size and colors for the word search exercise.

4. The system of claim 1 wherein game statistics are kept by the system for each session of the word search exercise with the user, measuring performance of the user against the time limit, and a performance summary is made available to the user.

5. A method for evaluating reading performance for a user, comprising the steps of:
   (a) providing an interactive display for the user by a computerized server connected to a network executing software from a non-transitory medium, the user connected to the computerized server through a network link;
   (b) enabling the user to select reading material for a word search exercise from stored choices, to select a word length for a passage of the reading material for the word search exercise, to set a time limit for the word search exercise, to select a number of words equal to or greater than two to be selected from the passage to populate a search list; and to start the word search exercise;
   (c) upon the word search exercise starting, displaying, by the system, the passage limited to the selected word length in a first window panel in the interactive display, with words in the passage rearranged in a random order;
   (d) selecting, by the system, the words from the passage equal to the number of words for the search list set by the user, the number of words in the search list different from each other in spelling and meaning;
   (e) displaying, by the system, the number of words selected for the search list in a second window panel separate from the first window panel;
   (f) choosing, by the user, a first word in the search list and clicking on the first word each time it appears in the passage, wherein the words in the passage have been rearranged in the random order;
   (g) displaying, by the system, the first word in the search list with a strikethrough when and if the user clicks on every instance of the first word in the passage;
   (h) choosing, by the user, a second word in the search list and clicking on the second word each time it appears in the passage;
   (i) displaying, by the system, the second word in the search list with a strikethrough when and if the user clicks on every instance of the second word in the passage; and
   (j) continuing, by the user, until all words in the search list are displayed with strikethroughs, at which time the word search exercise ends, or until the timer reaches the time; wherein, once all words in the search list are indicated as found, the user is enabled to repeat the word search exercise with a new search list of words, with different words than previously selected in the search list but of a same number.

6. The method of claim 5 wherein the user is enabled to upload the reading material to be stored for use by the software in word search exercises.

7. The method of claim 5 wherein the user is enabled to set font size and colors for the word search exercise.

8. The method of claim 5 wherein game statistics are kept for each session of the exercise with the user, measuring performance of the user against the time limit, and a performance summary is made available to the user.

\* \* \* \* \*